US012596644B2

(12) United States Patent
Liu et al.

(10) Patent No.: US 12,596,644 B2
(45) Date of Patent: Apr. 7, 2026

(54) TECHNIQUES FOR LOGICAL-TO-PHYSICAL INFORMATION COMPRESSION

(71) Applicant: Micron Technology, Inc., Boise, ID (US)

(72) Inventors: Daming Liu, Shanghai (CN); Qingyuan Wang, Shanghai (CN); Lei Cui, Shanghai (CN); Wenjun Wu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/612,896

(22) Filed: Mar. 21, 2024

(65) Prior Publication Data

US 2024/0345949 A1     Oct. 17, 2024

Related U.S. Application Data

(60) Provisional application No. 63/459,862, filed on Apr. 17, 2023.

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC ......... G06F 12/0246; G06F 2212/7201; G06F 2212/401; G06F 2212/466; G06F 12/0238; G06F 12/0292; G06F 12/0871; G06F 2212/1024; G06F 2212/1044
See application file for complete search history.

(56) References Cited

U.S. PATENT DOCUMENTS

| | | | | |
|---|---|---|---|---|
| 12,038,848 B1 * | 7/2024 | Kwok | .................. | G06F 12/1009 |
| 2013/0246689 A1 * | 9/2013 | Matsudaira | ......... | G06F 12/0246 711/103 |
| 2015/0169465 A1 * | 6/2015 | Slepon | ................ | G06F 12/0246 711/103 |
| 2017/0364446 A1 * | 12/2017 | Pham | .................. | G06F 12/1027 |
| 2018/0018100 A1 * | 1/2018 | Aho | ......................... | G06F 3/064 |
| 2018/0189000 A1 * | 7/2018 | Li | .......................... | G06F 3/0608 |

(Continued)

*Primary Examiner* — Kevin Verbrugge
(74) *Attorney, Agent, or Firm* — Holland & Hart LLP

(57) ABSTRACT

Methods, systems, and devices for techniques for logical-to-physical information compression are described. In some cases, a memory system may compress a logical-to-physical (L2P) mapping to expand the quantity of physical addresses mapped by the L2P mapping. For example, if a set of consecutive entries of an uncompressed L2P mapping includes consecutive physical addresses, the memory system may compress the consecutive entries into a single entry which includes a starting physical address of the consecutive physical addresses. Additionally, the memory system may include an indication of a starting logical address corresponding to the starting physical address in the compressed entry. To identify a physical address within the compressed entry, the memory system may determine an offset between a logical address corresponding to the physical address and the starting physical address using the indication, and may apply the offset to the starting physical address to determine the physical address.

20 Claims, 9 Drawing Sheets

200

(56)                    References Cited

U.S. PATENT DOCUMENTS

| | | | |
|---|---|---|---|
| 2019/0065387 A1* | 2/2019 | Duzly | G06F 12/0246 |
| 2019/0181881 A1* | 6/2019 | Matsuo | H03M 7/607 |
| 2021/0294752 A1* | 9/2021 | Palmer | G06F 12/1027 |
| 2021/0349829 A1* | 11/2021 | Cariello | G06F 12/0246 |
| 2023/0137736 A1* | 5/2023 | Cariello | G06F 12/1009 |
| | | | 711/104 |
| 2023/0350808 A1* | 11/2023 | Wang | G06F 12/10 |
| 2024/0078176 A1* | 3/2024 | Bi | G06F 13/1668 |
| 2024/0193095 A1* | 6/2024 | Xu | G06F 12/1054 |
| 2024/0330200 A1* | 10/2024 | Kwok | G06F 12/0246 |
| 2024/0362168 A1* | 10/2024 | Stoica | G06F 12/1009 |
| 2024/0370365 A1* | 11/2024 | Palmer | G06F 12/0292 |
| 2024/0385958 A1* | 11/2024 | Palmer | G06F 12/0246 |
| 2024/0427707 A1* | 12/2024 | Cariello | G06F 12/0246 |

* cited by examiner

605 — Receive Read Command

610 — Identify Region

615 — Region Hit?

620 — Region Compressed?

625 — Identify Physical Address

635 — Transmit Data

630

640

640

First Type          Second Type          Third Type

600

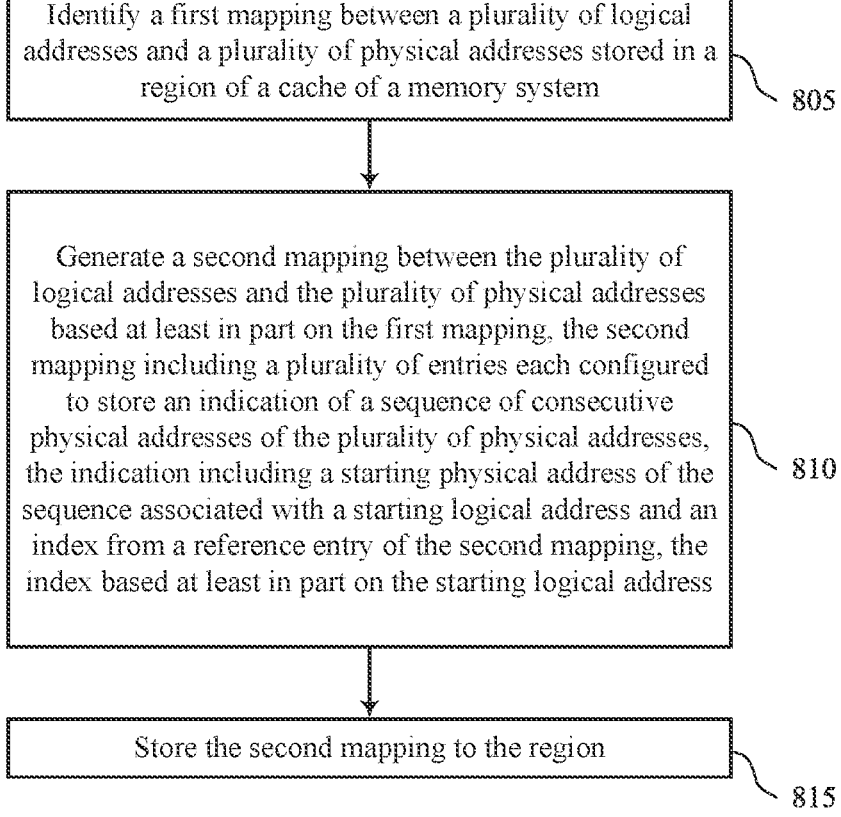

Identify a first mapping between a plurality of logical addresses and a plurality of physical addresses stored in a region of a cache of a memory system

805

Generate a second mapping between the plurality of logical addresses and the plurality of physical addresses based at least in part on the first mapping, the second mapping including a plurality of entries each configured to store an indication of a sequence of consecutive physical addresses of the plurality of physical addresses, the indication including a starting physical address of the sequence associated with a starting logical address and an index from a reference entry of the second mapping, the index based at least in part on the starting logical address

810

Store the second mapping to the region

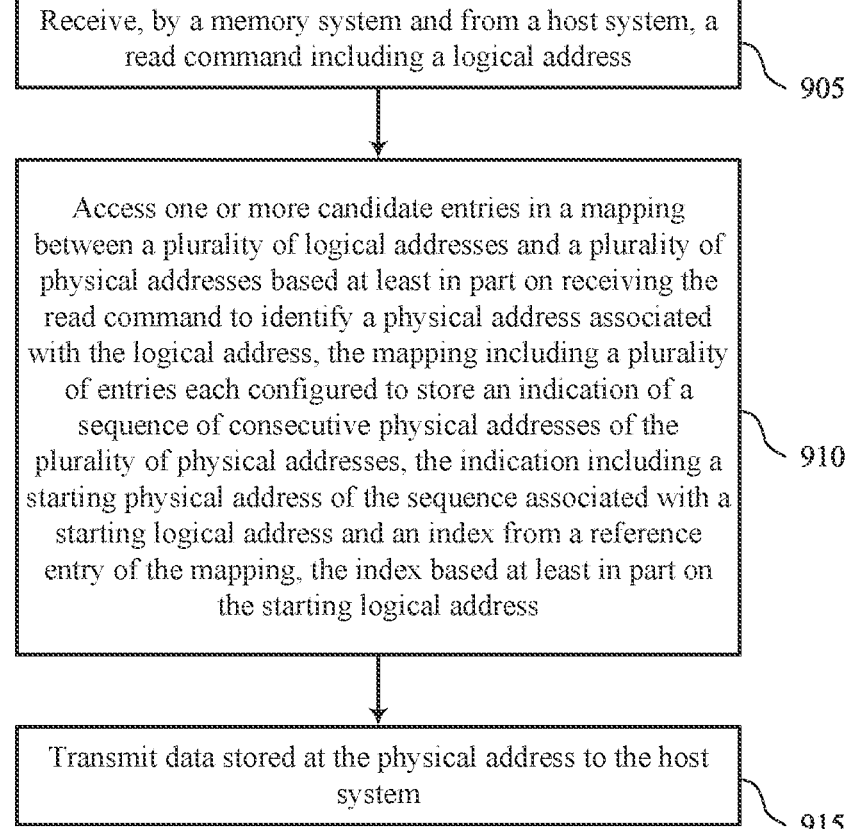

Receive, by a memory system and from a host system, a read command including a logical address

905

Access one or more candidate entries in a mapping between a plurality of logical addresses and a plurality of physical addresses based at least in part on receiving the read command to identify a physical address associated with the logical address, the mapping including a plurality of entries each configured to store an indication of a sequence of consecutive physical addresses of the plurality of physical addresses, the indication including a starting physical address of the sequence associated with a starting logical address and an index from a reference entry of the mapping, the index based at least in part on the starting logical address

910

Transmit data stored at the physical address to the host system

TECHNIQUES FOR LOGICAL-TO-PHYSICAL INFORMATION COMPRESSION

CROSS REFERENCE

The present Application for Patent claims priority to U.S. patent application Ser. No. 63/459,862 by Liu et al., entitled "TECHNIQUES FOR LOGICAL-TO-PHYSICAL INFORMATION COMPRESSION," filed Apr. 17, 2023, which is assigned to the assignee hereof, and which is expressly incorporated by reference in its entirety herein.

TECHNICAL FIELD

The following relates to one or more systems for memory, including techniques for logical-to-physical information compression.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIGS. 8 and 9 illustrate flowcharts showing a method or methods that support techniques for logical-to-physical information compression in accordance with examples as disclosed herein.

DETAILED DESCRIPTION

Figure 1:
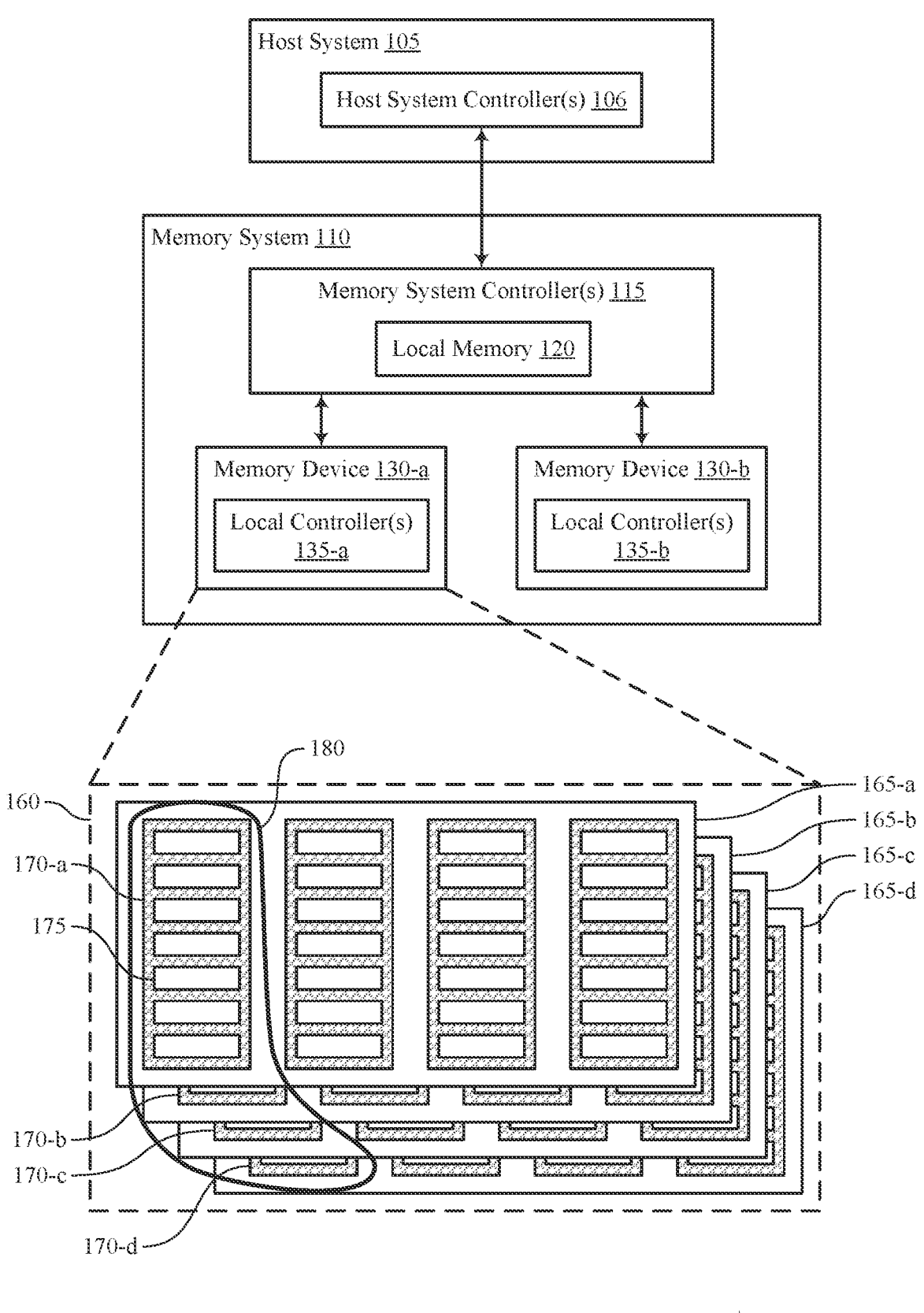
FIG. 1 illustrates an example of a system that supports techniques for logical-to-physical information compression in accordance with examples as disclosed herein.

A memory system may execute a performance test to measure system performance (e.g., random read performance) by receiving and performing a set of read commands that include logical addresses (e.g., random logical addresses, non-sequential logical addresses), which correspond to a first range of physical addresses (e.g., one gigabyte (GB) of physical memory). In some examples, the memory system may maintain a logical-to-physical (L2P) mapping, which may include a relationship between each logical address and physical addresses in the range within a fixed-size cache of the memory system. However, some performance tests may include read commands with logical addresses which correspond to a larger range physical addressees (e.g., between one GB and four GBs of physical address space). Because the L2P mapping stored in the cache of the memory system may not include relationships between logical addresses and physical addresses outside of the first range, the memory system may modify the L2P mapping, for example by retrieving additional L2P mappings (from a non-volatile memory device) for the larger range from a memory device coupled with the memory system. However, retrieving additional L2P mappings from a memory device may be a relatively slow process (e.g., compared with utilizing a mapping already stored in the cache). Accordingly, techniques to compress an L2P mapping to increase the covered range of physical addressing space while maintaining the size of the L2P mapping stored in the cache (e.g., the amount of space within the cache used to store the L2P mapping) may be desired.

As described herein, a memory system may compress an L2P mapping to expand the quantity of physical addresses mapped by the L2P mapping within a given size of the L2P mapping. For example, if a set of consecutive entries of an uncompressed L2P mapping includes consecutive physical addresses, the memory system may compress the consecutive entries into a single entry which includes a starting physical address of the consecutive physical addresses. Additionally, the memory system may include an indication of a starting logical address corresponding to the starting physical address in the compressed entry. To identify a physical address within the compressed entry, the memory system may determine an offset between a logical address corresponding to the physical address (e.g., a logical address included in a read command for data stored at the physical address) and the starting physical address using the indication, and may apply the offset to the starting physical address to determine the physical address. Compressing the L2P mapping may allow the L2P mapping to cover an expanded range of physical address space without increasing the size of the L2P mapping.

In addition to applicability in memory systems as described herein, techniques for improved logical-to-physical information compression may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by facilitating better logical-to-physical information compression, which may allow the L2P mapping to cover an expanded range of physical address space without increasing the size of the L2P mapping, decrease processing or latency times, improve response times, or otherwise improve user experience, among other benefits.

Features of the disclosure are initially described in the context of systems, devices, and circuits with reference to FIG. 1. Features of the disclosure are described in the context of systems and process flows with reference to FIGS. 2 through 6. These and other features of the disclosure are further illustrated by and described in the context of an apparatus diagram and flowchart that relate to techniques for logical-to-physical information compression with reference to FIGS. 7 through 9.

FIG. 1 illustrates an example of a system 100 that supports techniques for logical-to-physical information compression in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with one or more host system controllers 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), one or more memory controllers (e.g., NVDIMM controller), and one or more storage protocol controllers (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between one or more host system controllers 106 of the host system 105 and one or more memory system controllers 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include one or more memory system controllers 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) one or more local controllers 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, L2P mapping tables may be maintained and data may be marked as valid or invalid at the page level of granularity, and a page 175 may contain valid data, invalid data, or no data. Invalid data may be data that is outdated, which may be due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system 110 may utilize one or more memory system controllers 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support techniques for logical-to-physical table compression. For example, the host system 105 (e.g. one or more host system controllers 106), the memory system 110 (e.g., one or more memory system controllers 115), or a memory device 130 (e.g., one or more local controllers 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In some cases, a memory system 110 may compress an L2P mapping to expand the quantity of physical addresses mapped by the L2P mapping. For example, if a set of consecutive entries of an uncompressed L2P mapping includes consecutive physical addresses, the memory system 110 may compress the consecutive entries into a single entry which includes a starting physical address of the consecutive physical addresses. Additionally, the memory system 110 may include an indication of a starting logical address corresponding to the starting physical address in the compressed entry. To identify a physical address within the compressed entry, the memory system 110 may determine an offset between a logical address corresponding to the physical address (e.g., a logical address included in a read command for data stored at the physical address) and the starting physical address using the indication, and may apply the offset to the starting physical address to determine the physical address. Compressing the L2P mapping may allow the L2P mapping to cover an expanded range of physical address space without increasing the size of the L2P mapping.

Figure 2:
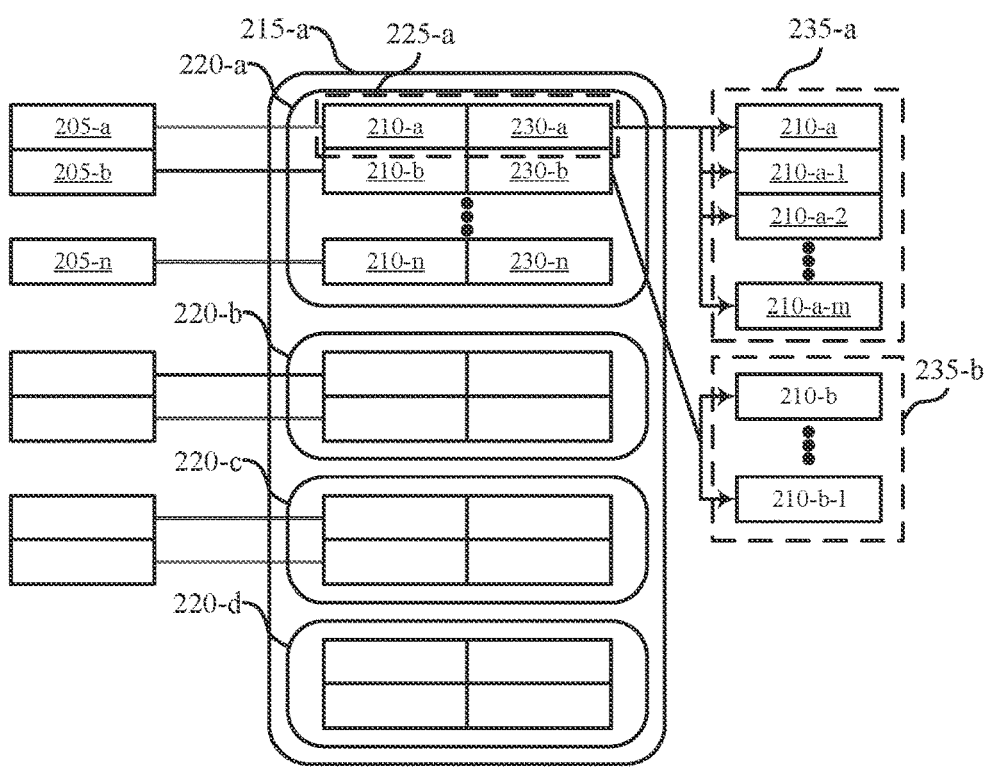
FIG. 2 illustrates an example of a system that supports techniques for logical-to-physical information compression in accordance with examples as disclosed herein.
Figure 2:
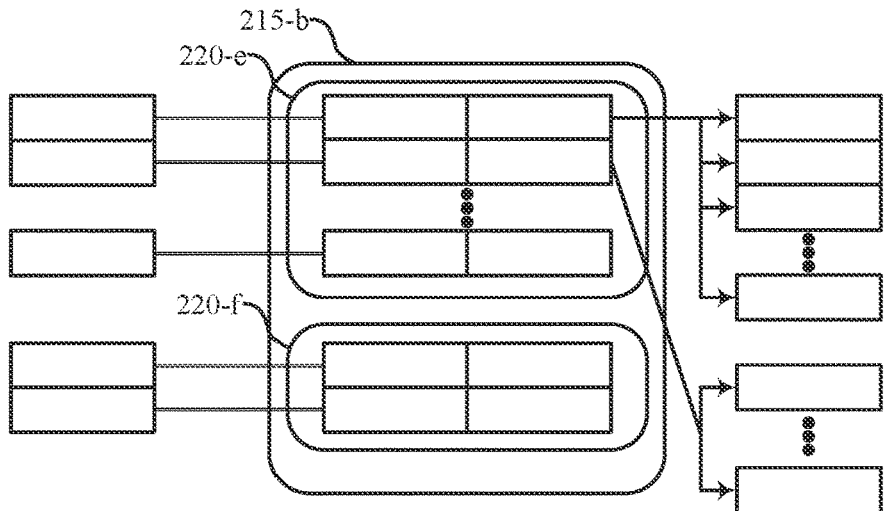

FIG. 2 illustrates an example of a system 200 that supports techniques for logical-to-physical information compression in accordance with examples as disclosed herein. In some cases, a memory system may store data at a granularity, such as a page granularity. For example, the memory system may store a page of data at a physical address 210 (e.g., a physical location of a page, a physical set of memory cells) of a memory device coupled with the memory system. Because the physical address of a page of data may change (e.g., due to maintenance operations, such as wear-leveling or garbage collection), the memory system may maintain one or more mappings which associate physical addresses of pages of data with logical addresses, such as the system 200. The memory system may use one or more mappings to map a logical address 205 (e.g., a logical address 205 received from a host system as part of a read command) to a physical address, so that the memory system may retrieve data stored at the physical address.

Because memory space within a cache of the memory system may be limited (e.g., may be a fixed size), the memory system may store portions of the one or more mappings within the cache, which may allow the memory system to efficiently access the physical addresses 210 corresponding to logical addresses 205 associated with the cached mappings. In such examples, the entire mapping may be stored in non-volatile memory devices and portions of the mapping may be transferred to the cache as used for access operations. For example, the memory system may store multiple hierarchies or levels of mappings, where entries of an upper level mapping may point to (e.g., may store an address of) an entry of a lower level system 200, which may store physical addresses 210. Although the above example uses a two level hierarchy of mappings, one skilled in the art may appreciate than any quantity of levels are possible In some examples, the system 200 (e.g., the mapping which stores physical addresses 210 of pages) may compress one or more regions 220 to increase the quantity of physical addresses 210 mapped by the system. For example, the system 200 may include one or more slots 215, such as a slot 215-a and a slot 215-b. In some examples, a slot 215 may correspond to a fixed size of data (e.g., a fixed amount of memory space within the cache, a fixed quantity of entries 225). Additionally, a slot 215 may be organized into one or more regions 220, which may hold a set of entries 225. As described herein, a mapping may refer to one or more slots 215, one or more regions 220, or a combination thereof. In some examples, a slot 215, a region 220, or both may include or may be associated with metadata, such as an identifier, a version identifier (e.g., a version number), an indication of whether and how the slot 215 or region 220 is compressed (a compression type), or a combination thereof.

An entry 225 of a compressed region 220 as described herein may include a starting physical address 210 (e.g., a physical page address (PPA)) and an index 230. TABLE 1 may provide an illustrative example of entries 225 of a region 220 associated with a first logical address 205 (e.g., logical address '0'), a second logical address 205 (e.g., a logical address i), a third logical address 205 (e.g., a logical address j), and a fourth logical address 205 (e.g., a logical address k).

TABLE 1

| Logical Address | Physical Address (4 Bytes) | Index (16 Bits) |
| --- | --- | --- |
| 0 | PPA(0) | 0 |
| i | PPA(i) | i |
| j | PPA(j) | i + j |
| k | PPA(k) | i + j + k |

An index 230 of an entry 225 may indicate the quantity of logical addresses 205 between the logical address 205 associated with the entry 225 and a reference logical address 205, such as logical address '0' (e.g., the first logical address of the region 220). For example, because the entry 225-a may be the first entry 225 in the region 220-a, the index 230-a may be an initial value (e.g., may be zero), the index 230-b may include the quantity of logical address 205 between the logical address 205-b and the logical address 205-a, and the index 230-n of the nth entry 225 may include the quantity of logical address 205 between the logical address 205-n and the logical address 205-n. In some examples, the indices 230 may support searching for a particular address, as described in greater detail with reference to FIG. 6.

A starting physical address 210 may be the first physical address of a continuous sequence 235 of physical addresses 210. The continuous sequence 235 may include an ordered set of consecutive physical addresses 210 which corresponds to a continuous physical region of a memory device of the memory system. Additionally, the consecutive physical addresses 210 of a continuous sequence may be associated with a set of consecutive logical addresses 205. For example, the physical address 210-a of the continuous sequence 235-a may correspond to the logical address 205-a (e.g., the logical address '0'), the physical address 210-a-1 may correspond to a next logical address consecutive with the logical address 205-a (e.g., the logical address '1'), the physical address 210-a-2 may correspond to a logical address consecutive with the next logical address (e.g., the logical address '2'), and the physical address 210-a-m may correspond to the mth logical address following the logical address 205-a (e.g., the logical address 'm'). Similarly, the physical address 210-b of the continuous sequence 235-b may correspond to the logical address 205-b, the physical address 210-b-1 may correspond to the lth logical address following the logical address 205-b, and the physical address 210-n may correspond to the logical address 205-n. In some examples, the starting physical addresses 210 of a region 220 may be sequential (e.g., may be arranged in increasing order).

By way of example, to identify the physical address 210-a-1 associated with a logical address 205 which is consecutive to the logical address 205-a, the memory system may access the entry 225-a, and may determine an offset between the logical address 205-a and the consecutive logical address 205. Because the physical address 210-a-1 and the physical address 210-a are included in the same continuous sequence 235, the memory system may apply the offset to the physical address 210-a (e.g., may add the offset to the physical address 210-a) to obtain the physical address 210-a-1.

In some cases, the system 200 may include multiple types of regions 220. For example, the system 200 may include a first type of region 220 (e.g., a 1 kilobyte (KB) region) with a size (e.g., a quantity of entries 225, an amount of memory used to store the entries 225) which is less than a first threshold (e.g., less than 1 KB), a second type of region 220 (e.g., a 2 KB region) with a size which exceeds the first threshold and is less than a second threshold (e.g., less than 2 KB), and a third type of region 220 (e.g., a 4 KB region) with a size which exceeds the second threshold. To support efficient utilization of memory within the cache, the memory system may store regions 220 with a same type within a same slot 215. For example, the slot 215-a may store a first quantity of regions 220 with the first type (e.g., the region 220-a, the region 220-b, the region 220-c, and the region 220-d), and the slot 215-b may store a second quantity of regions 220 with the second type (e.g., the region 220-c and the region 220-f). In some cases, a slot 215 which stores a region 220 of the third type may store a single region 220. In such cases, the region 220 of the third type may be an example of an uncompressed region 220, which may include up to a third threshold size of entries (e.g., 4 KB).

In some examples, the memory system may support dynamic compression of region 220. For example, the memory system may support an operational mode, such as a slot extension mode. If the slot extension mode is active, the memory system may support compressing regions 220. Alternatively, if the slot extension mode is not active, the memory system may not support compressing regions 220. In some cases, while in the slot extension mode, the memory system may refrain from compressing one or more regions 220. For example, if the compressibility of the mappings of the system 200 are below a threshold (e.g., if the quantity of regions 220 which may be compressed is below a threshold), the slot extension mode may be temporarily disabled, and may be reenabled during subsequent operations.

Compressing regions 220 of the system 200 may allow the system 200 to map an expanded range of logical addresses 205 to physical addresses 210, without increasing the size of the system 200. For example, a slot 215 having compressed regions 220 of the first type may allow the memory system to map a greater quantity of logical addresses 210 to physical addresses 205 compared with a slot 215 having compressed regions 220 of the second type. and a slot 215 having compressed regions 220 of the second type may allow the memory system to map a greater quantity of logical addresses 210 to physical addresses 205 compared with a slot 215 having uncompressed regions 220. Because each slot 215 may use a same size of data, regardless of the type of stored region 220, a system 200 which includes a quantity slots 215 with compressed regions 220 may map an expanded range compared with a system 200 which includes the same quantity of slots 215 without compressed regions 220.

Figure 3:
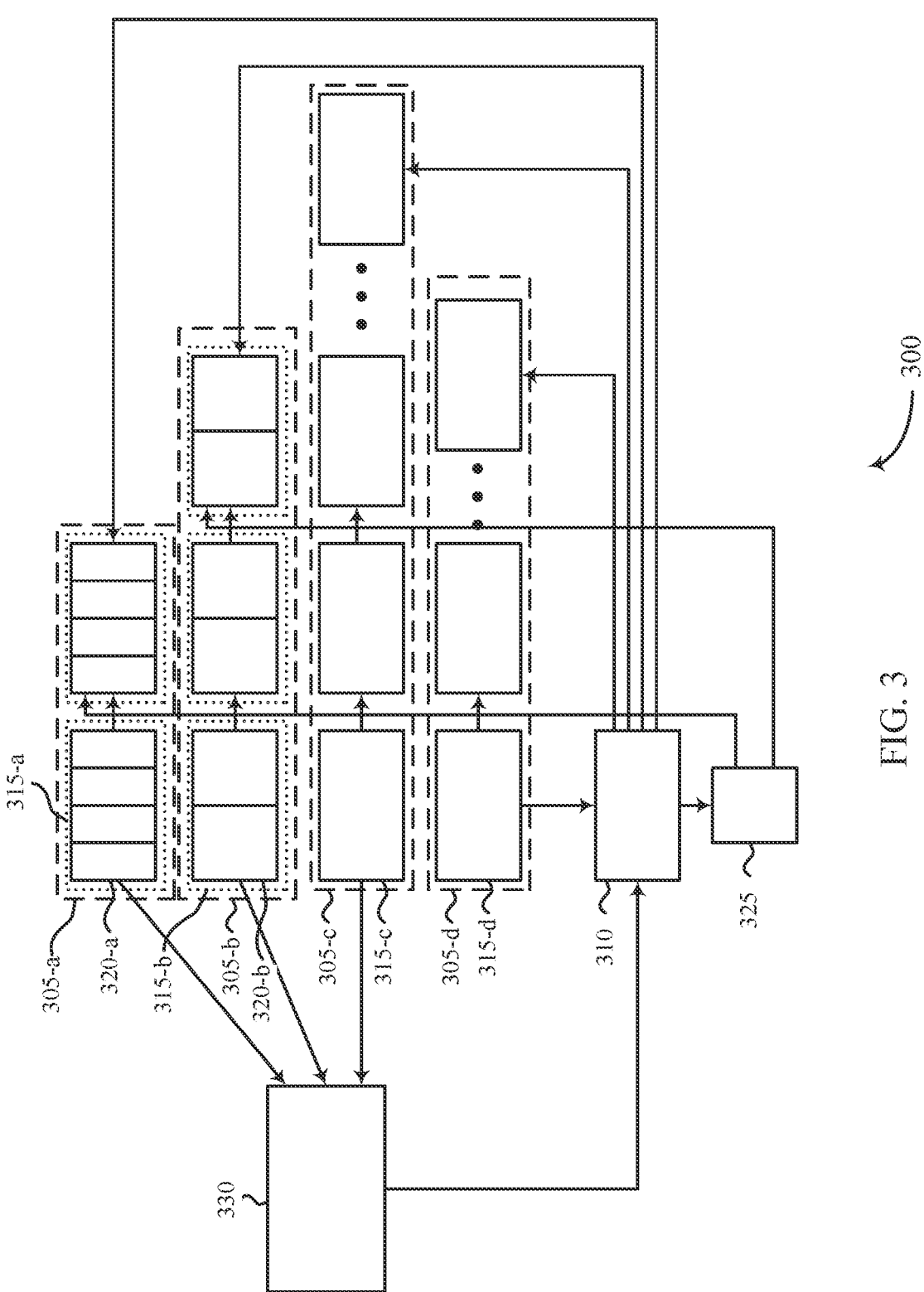
FIG. 3 illustrates an example of a system that supports techniques for logical-to-physical information compression in accordance with examples as disclosed herein.

FIG. 3 illustrates an example of a system 300 that supports techniques for logical-to-physical information compression in accordance with examples as disclosed herein. The system 300 may include aspects of a data flow implemented by a memory system (e.g., by one or more controllers of a memory system) which supports compressing a mapping, such as the system 200. For example, the system 300 may illustrate a flow to select a mapping, such as a slot 315, for compression and add the compressed mapping to an appropriate queue 305 of a set of queues 305 of the system 300.

A queue 305 may be an example of a conceptual organization (e.g., a data structure, such as a list) of elements, such as one or more slots 315 of one or more regions 320, which may each be examples of the corresponding components as described with reference to FIG. 2. A queue 305 may include one or more slots 315 with one or more regions 320 of a particular type, For example, the queue 305-*a* may include one or more slots 315-*a*, where each slot 315-*a* may include one or more regions 320-*a* of a first type (e.g., 1 KB regions 320), the queue 305-*b* may include one or more slots 315-*b*, each of which may include one or more regions 320-*b* of a second type (e.g., 2 KB regions 320), and the queue 305-*c* may include one or more slots 315-*c*, each of which may include one or more regions 320—of a third type (e.g., 4 KB regions 320).

Additionally, the system 300 may include a free queue 305-*d*, which may include one or more slots 315-*d* which may not have been compressed. As part of the data flow, the memory system may populate the free queue 305-*d* with one or more uncompressed slots 315 of an initial L2P mapping. In some examples, the initial L2P mapping may track mappings between logical addresses and physical addresses as part of the memory system processing read commands and write commands from a host system. For example, the memory system may receive a write command and associated data from the host system, may store the data to a physical address, and may store a relation between the physical address and an associated logical address to an initial L2P mapping, such as a change log manager. In such examples, entries of the initial L2P mapping may not include an index (e.g., an index 230). Accordingly, a quantity of bit of such an entry may include less bits that a quantity of entries of a compressed entry 225. In some cases, such as if a threshold quantity of physical addresses are stored in the initial L2P mapping, the system 300 may transfer at least a portion of the initial L2P mapping to the free queue 305-*d*.

In some cases, the memory system may determine to compress the initial mapping, the slots 315 of the queues 305, or both, for example as part of background memory operations. In such cases, the memory system may allocate a buffer 310, for example using a portion or region of a cache of the memory system, and may add each slot of the initial L2P mapping to the free queue 305-*d*. In some examples, the memory system may populate or maintain the queue 305-*a*, the queue 305-*b*, and the queue 305-*c* with slots 315 having regions 320 of the corresponding type.

The memory system may select a slot 315 from a queue 305 and transfer the selected slot 315 from the selected queue 305 to the buffer 310. For example, if the memory system determines that the free queue 305-*d* holds at least one slot 315, the memory system may remove the first slot 315 from the queue 305-*d* (e.g., the head of the queue 305-*d*) and may store the slot to the buffer 310.

In some cases, the memory system may compress the slot 315 (e.g., in accordance with the compression as described with reference to FIG. 2) to a compressed region 320 and transfer the slot 315 to the appropriate queue 305, in accordance with the type of the compressed region. Additionally or alternatively, if the memory system determines that a compressed version of the slot 315 exceeds a threshold (e.g., the second threshold as described with reference to FIG. 2), the memory system may determine that the slot 315 is of the third type, and may refrain from compressing the slot 315. In such cases, the memory system may add the slot 315 to the queue 305-*c*.

In some examples, the memory system may determine that the free queue 305-*d* is empty (e.g., does not contain a slot 315). In such cases, the memory system may select a slot 315 to compress from the queue 305-*a*, the queue 305-*b*, or the queue 305-*c*. For example, the memory system may select the oldest of the first slots 315 of the queue 305-*a*, the queue 305-*b*, and the queue 305-*c*. That is, the memory system may, using the version compare component 330, compare the version (e.g., the version identifier, the version number) of the slot 315-*a*, the slot 315-*b*, and the slot 315-*c* and select the slot 315 with the smallest (e.g., earliest) version. The memory system may transfer the selected slot 315 to the buffer 310, may transfer and, in some cases, compress the selected slot to the buffer 325, and may add the slot 315 from the buffer 325 to the appropriate queue 305.

Figure 4:
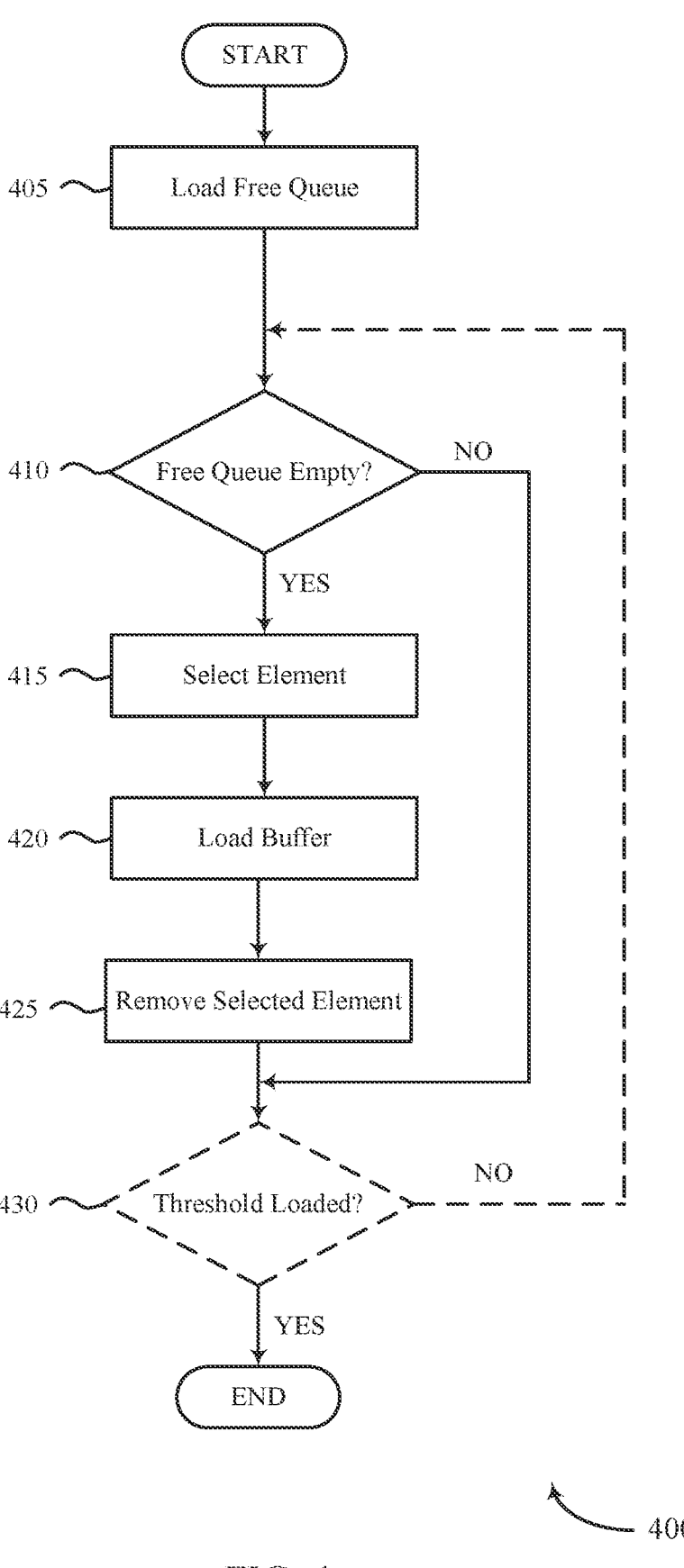
FIG. 4 illustrates an example of a process flow that supports techniques for logical-to-physical information compression in accordance with examples as disclosed herein.

FIG. 4 illustrates an example of a process flow 400 that supports techniques for logical-to-physical information compression in accordance with examples as disclosed herein. In some examples, a memory system, such as the memory system described with reference to FIGS. 1 through 3, may implement the process flow 400 using one or more controllers (e.g., one or more memory system controllers). In the following description of process flow 400, the operations may be performed in a different order than the order shown. For example, specific operations may also be left out of process flow 400, or other operations may be added to process flow 400.

The process flow 400 may illustrate a method to select a slot (e.g., a slot 215, a slot 315) to load to a buffer, such as the buffer 310. In some examples, the memory system may perform aspects of the process flow 400 as part of compressing one or more levels of an L2P mapping, such as during a background operations. Additionally, the memory system may perform aspects of the process flow 400 as part of an initialization procedure, such as loading an L2P mapping stored in a memory device of the memory system (e.g., non-volatile memory device, NAND device) to a cache of the memory system, such as one or more buffers (e.g., SRAM buffers). In some examples, the memory system may perform the process flow 400 iteratively, and may maintain one or more queues (e.g., the one or more queues 305) across iterations.

At 405, a free queue may be loaded. For example, the memory system may populate the free queue (e.g., the free queue 305-*d*) with one or more slots of an initial L2P mapping. Accordingly, each element of the free queue (e.g., each slot of the free queue) may include an uncompressed mapping. In some examples, the memory system may store the free queue in a region of the cache of the memory system separate from the region used for L2P mappings.

At 410, it may be determined whether the free queue includes one or more uncompressed mappings. For example, the memory system may determine whether the free queue is empty (e.g., whether the free queue includes at least one slot). If the free queue is not empty the memory system may select the first slot of the free queue (e.g., the head of the free queue) and may load the selected slot to the buffer for compression and remove the selected slot from the free queue, as described with reference to FIG. 5.

In some cases, the memory system may load multiple buffers concurrently, which may improve efficiency of selecting and compressing slots. For example, at 430, it may be determined whether a threshold quantity of buffers have been loaded (e.g., whether a quantity of load requests exceeds the threshold). If the quantity of loaded buffers does not satisfy the threshold, the process flow may return to 410, and the memory system may select a second slot to load to a second buffer.

If, at 410, the memory system determines that the free queue is empty (e.g., that the free queue does not include at least one slot), a slot of a separate queue may be selected at 415. For example, the memory system may compare version identifiers of the first slots (e.g., head slots) of a first queue (e.g., a queue which includes regions of the first type), a second queue (e.g., a queue which includes regions of the second type), and a third queue (e.g., a queue which includes regions of the third type). The memory system may determine which version identifier satisfies a threshold (e.g., which slot is the oldest of the compared slots), and may select the corresponding slot. Accordingly, at 420, the selected slot may be loaded to the buffer. At 425, the selected slot may be removed from the corresponding queue, and the process flow may proceed to 430.

Aspects of the process flow 400 may be implemented by one or more controllers, among other components. Additionally or alternatively, aspects of the process flow 400 may be implemented as instructions stored in memory (e.g., firmware stored in a memory coupled with the memory system). For example, the instructions, when executed by one or more controllers, may cause the one or more controllers to perform the operations of the process flow 400.

Figure 5:
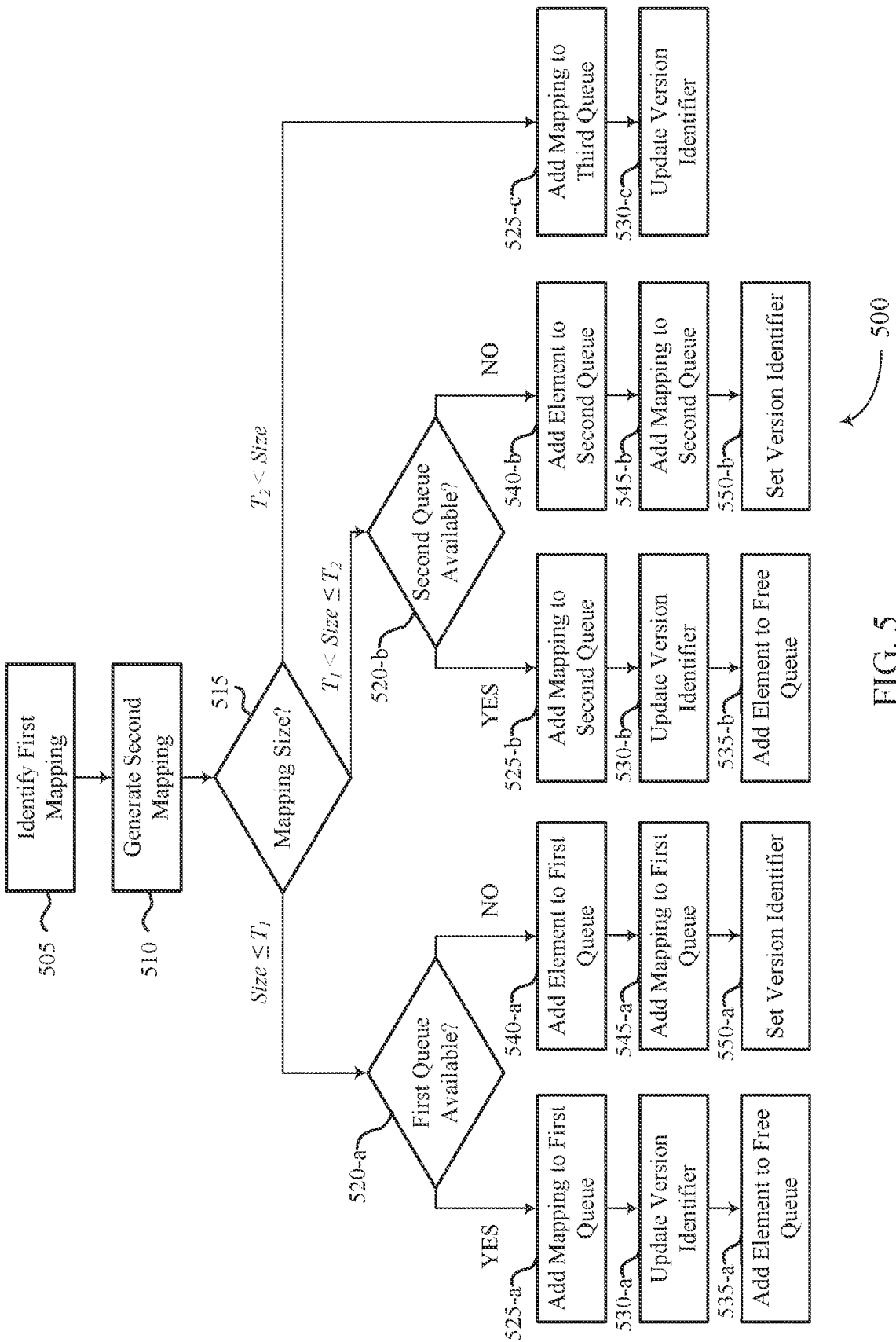
FIG. 5 illustrates an example of a process flow that supports techniques for logical-to-physical information compression in accordance with examples as disclosed herein.

FIG. 5 illustrates an example of a process flow 500 that supports techniques for logical-to-physical information compression in accordance with examples as disclosed herein. In some examples, a memory system, such as the memory system described with reference to FIGS. 1 through 4, may implement the process flow 500 using one or more controllers (e.g., one or more memory system controllers). In the following description of process flow 500, the operations may be performed in a different order than the order shown. For example, specific operations may also be left out of process flow 500, or other operations may be added to process flow 500.

The process flow 500 may illustrate a method to compress entries of a slot (e.g., a slot 215, a slot 315) to into a single region. In some examples, the memory system may perform aspects of the process flow 500 iteratively, and may maintain one or more queues (e.g., the one or more queues 305) across iterations.

At 505, a mapping between a set of logical addresses and a set of physical addresses may be identified. For example, the memory system may, using aspects of the process flow 400, select a slot from a head of a first queue associated with regions of a first type, a second queue associated with regions of a second type, a third queue associated with regions of a third type, or a fourth queue (e.g., a free queue), and store the selected slot in a buffer.

At 510, a second mapping between the set of logical addresses and the set of physical addresses may be generated. For example, the memory system may compress one or more entries of the selected slot (e.g., in accordance with the compression as described with reference to FIG. 2) into a set of compressed entries.

At 515, it may be determined whether a quantity of the set of compressed entries satisfies threshold one or more thresholds. For example, the memory system may determine whether the size of the set of compressed entries is less than or equal to a first threshold (e.g., $T_1$, 1 KB), whether the size is between the first threshold and a second threshold (e.g., $T_2$, 2 KB), or whether the size exceeds the second threshold and the first threshold.

If the memory system determines that the size is less than or equal to the first threshold, the memory system may determine to store the set of compressed entries in a region of the first type. Accordingly, at 520-*a*, it may be determined whether a region of a slot of the first queue is available. For example, the memory system may access the last slot of the first queue (e.g., the tail). If the last slot includes one or more free regions (e.g., one or more regions which do not include entries), the set of compressed entries may, at 525-*a*, be added to a region of the one or more free regions.

At 530-*a*, the version identifier of the last slot may be updated. For example, in response to updating the last slot with the set of compressed entries, the memory system may update the version identifier (e.g., version number) to indicate the age of the last slot, relative to slots of the first queue, second queue, and third queue. In some examples, at 535-*a*, a slot may be added to the fourth queue. For example, the memory system may remove the set of compressed entries from the slot selected at 505, and may allocate memory space associated with the slot to the fourth queue (e.g., may enqueue an empty slot to the fourth queue).

If, at 520-*a*, the memory system determines that a region of the last slot of the first queue is not available (e.g., if the last slot if filled), a region of the cache may, at 540-*a*, be allocated to the first queue. For example, the memory system may add an empty slot to the first queue (e.g., may enqueue a slot to the first queue). At 545-*a*, the set of compressed entries may be added to the added slot, and, at 550-*a*, the version identifier of the added slot may be set.

Alternatively, the memory system may determine that the size of the set of compressed entries is between the first threshold and the second threshold, and thus may determine to store the set of compressed entries in a region of the second type. Accordingly, at 520-*b*, it may be determined whether a region of a slot of the second queue is available. For example, the memory system may access the last slot of the second queue. If the last slot includes one or more free regions, the set of compressed entries may, at 525-*b*, be added to a region of the one or more free regions.

At 530-*b*, the version identifier of the last slot may be updated. For example, in response to updating the last slot with the set of compressed entries, the memory system may update the version identifier to indicate the age of the last slot, relative to slots of the first queue, second queue, and third queue. In some examples, at 535-*b*, a slot may be added to the fourth queue. For example, the memory system may remove the set of compressed entries from the slot selected at 505, and may allocate memory space associated with the slot to the fourth queue.

If, at 520-*b*, the memory system determines that a region of the last slot of the second queue is not available, a region of the cache may, at 540-*b*, be allocated to the second queue. For example, the memory system may add an empty slot to the second queue. At 545-*b*, the set of compressed entries may be added to the added slot, and, at 550-*b*, the version identifier of the added slot may be set.

In some cases, at 515, the memory system may determine that the quantity of the set of compressed entries exceeds the second threshold. In such cases, the uncompressed entries of the slot selected at 505 may, at 525-*c*, be added to the third queue and, at 530-*c*, the version identifier of the added slot may be set. For example, the memory system may allocate a slot to the third queue and may store the set of uncompressed entries to the allocated slot. In such cases, the memory system may refrain from compressing the set of entries.

Compressing and managing entries within regions and slots, as described with reference to FIGS. 1 through 5, may allow the memory system to map an expanded range of logical addresses to physical addresses, without increasing the size of the cache. For example, updating version identifiers and maintaining the first queue, second queue, third queue, and fourth queue may support efficient access of compressed entries, uncompressed entries, or both.

Aspects of the process flow 500 may be implemented by one or more controllers, among other components. Additionally or alternatively, aspects of the process flow 500 may be implemented as instructions stored in memory (e.g., firmware stored in a memory coupled with the memory system). For example, the instructions, when executed by one or more controllers, may cause the one or more controllers to perform the operations of the process flow 500.

Figure 6:
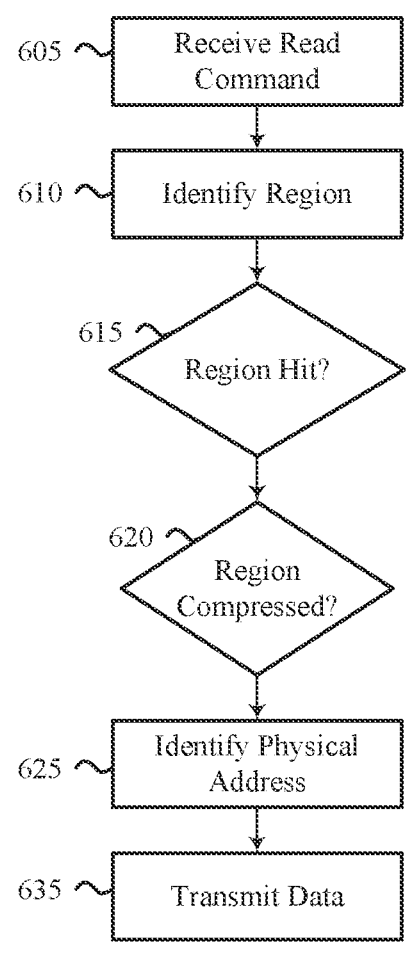
FIG. 6 illustrates an example of a process flow that supports techniques for logical-to-physical information compression in accordance with examples as disclosed herein.
Figure 6:
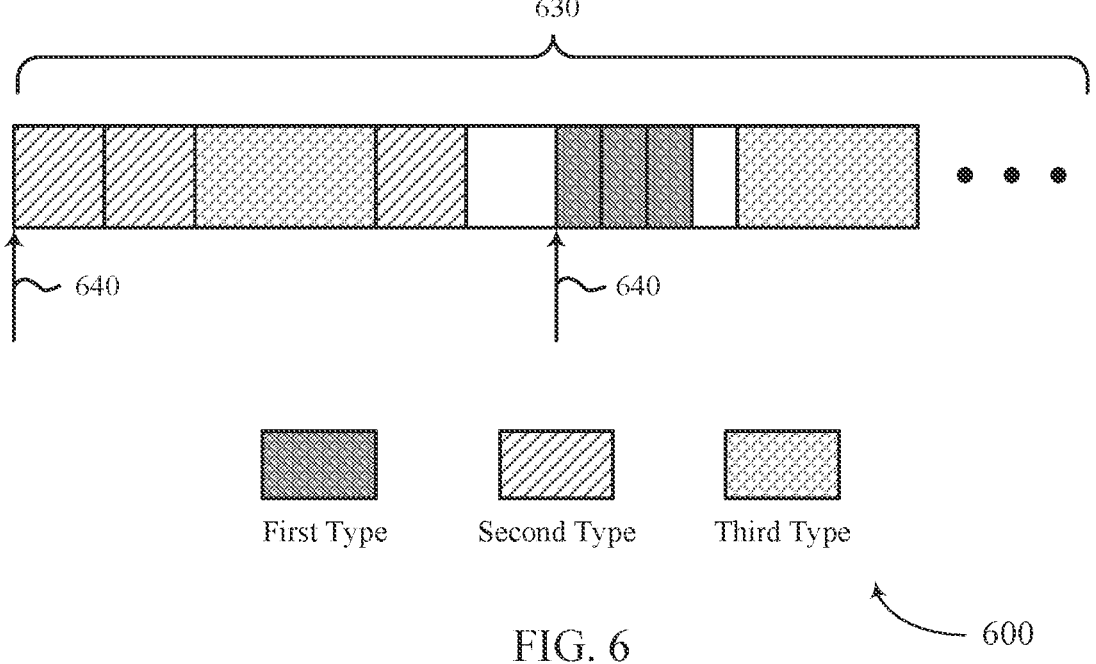

FIG. 6 illustrates an example of a process flow 600 that supports techniques for logical-to-physical information compression in accordance with examples as disclosed herein. In some examples, a memory system, such as the memory system described with reference to FIGS. 1 through 5, may implement the process flow 600 using one or more controllers (e.g., one or more memory system controllers). In the following description of process flow 600, the operations may be performed in a different order than the order shown. For example, specific operations may also be left out of process flow 600, or other operations may be added to process flow 600.

The process flow 600 may illustrate a method to identify a physical address corresponding to a logical address associated with data. For example, at 605, a read command for the data may be received. In some cases, the memory system may receive the read command, along with the associated logical address from a host system.

At 610, a region identifier may be identified. For example, the memory system may use the received logical address to determine the region identifier (e.g., a region number) corresponding to a region in which the relation between the logical address and the physical address is stored. In some cases, the memory system may use one or more higher level mappings to identify the region. For example, an entry of a higher level table may point to an address 640 within a cache 630 of a starting entry of the region.

In some cases, it may be determined, at 615, whether the identified region includes an entry corresponding to the logical address (e.g., whether the region "hits" the logical address) and it may be determined, at 620, whether the identified region is compressed.

If the memory system determines that the identified region includes an entry corresponding to the logical address and that the region is compressed, at 625, the physical address corresponding to the logical address may be identified. For example, the memory system may perform a search through the entries of the region for a starting physical address associated with a continuous sequence (e.g., a continuous sequence 235, as described with reference to FIG. 2) which includes the physical address.

In some examples, the memory system may use a binary search to identify the physical address. For example, the memory system may determine a first index between the logical address and a logical address associated with a reference entry of the region (e.g., the first entry of the region). In some examples, the first index may correspond to an offset between the logical address and the logical address associated with the reference entry. By way of example, the memory system may access one or more candidate entries of the region and compare the index of the candidate region (e.g., the index 230) to determine a next set of candidate entries, in accordance with a binary search scheme of the logical addressing space of the L2P mapping.

Upon identifying the entry which includes the starting physical address associated with the continuous sequence which includes the physical address, the memory system may determine an offset between the first index and the index of the entry. The memory system may apply the offset (e.g., add the offset) to the starting physical address to identify the physical address associated with the logical address included in the read command. Accordingly, at 635, the data stored at the physical address may be accessed and transmitted to the host system.

Aspects of the process flow 600 may be implemented by one or more controllers, among other components. Additionally or alternatively, aspects of the process flow 600 may be implemented as instructions stored in memory (e.g., firmware stored in a memory coupled with the memory system). For example, the instructions, when executed by one or more controllers, may cause the one or more controllers to perform the operations of the process flow 600.

Figure 7:
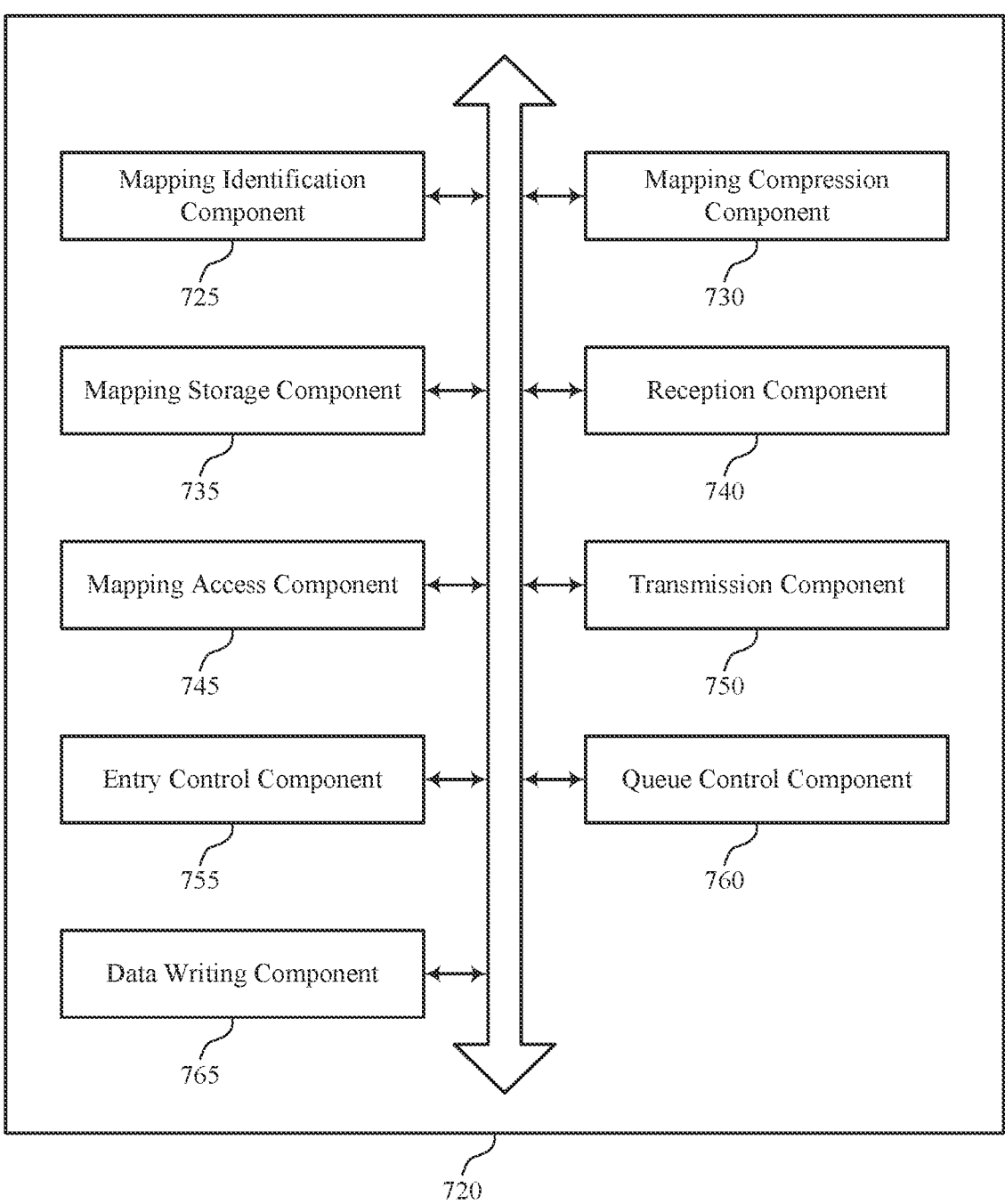
FIG. 7 illustrates a block diagram of a memory system that supports techniques for logical-to-physical information compression in accordance with examples as disclosed herein.

FIG. 7 illustrates a block diagram 700 of a memory system 720 that supports techniques for logical-to-physical information compression in accordance with examples as disclosed herein. The memory system 720 may be an example of aspects of a memory system as described with reference to FIGS. 1 through 6. The memory system 720, or various components thereof, may be an example of means for performing various aspects of techniques for logical-to-physical information compression as described herein. For example, the memory system 720 may include a mapping identification component 725, a mapping compression component 730, a mapping storage component 735, a reception component 740, a mapping access component 745, a transmission component 750, an entry control component 755, a queue control component 760, a data writing component 765, or any combination thereof. Each of these components may communicate, directly or indirectly, with one another (e.g., via one or more buses).

The mapping identification component 725 may be configured as or otherwise support a means for identifying a first mapping between a plurality of logical addresses and a plurality of physical addresses stored in a region of a cache of a memory system. The mapping compression component 730 may be configured as or otherwise support a means for generating a second mapping between the plurality of logical addresses and the plurality of physical addresses based at least in part on the first mapping, the second mapping including a plurality of entries each configured to store an indication of a sequence of consecutive physical addresses of the plurality of physical addresses, the indication including a starting physical address of the sequence associated with a starting logical address and an index from a reference entry of the second mapping, the index based at least in part on the starting logical address. The mapping storage component 735 may be configured as or otherwise support a means for storing the second mapping to the region.

In some examples, to support storing the second mapping to the region, the entry control component 755 may be configured as or otherwise support a means for determining that a quantity of the plurality of entries in the second mapping satisfies a threshold. In some examples, to support storing the second mapping to the region, the queue control component 760 may be configured as or otherwise support a means for adding the second mapping to an element of a queue of a plurality of queues based at least in part on the determining, each queue of the plurality of queues corresponding to a different threshold of a plurality of thresholds and each queue of the plurality of queues including one or more elements.

In some examples, the queue control component 760 may be configured as or otherwise support a means for allocating a second region of the cache to the queue, where adding the second mapping to the queue includes writing the second mapping to the second region.

In some examples, the queue control component 760 may be configured as or otherwise support a means for updating a version identifier of the element based at least in part on adding the second mapping to the element.

In some examples, to support identifying the first mapping, the queue control component 760 may be configured as or otherwise support a means for determining that a queue of a plurality of queues includes one or more uncompressed mappings, where the first mapping includes an uncompressed mapping of the one or more uncompressed mappings.

In some examples, to support identifying the first mapping, the queue control component 760 may be configured as or otherwise support a means for determining that a first queue of a plurality of queues associated with uncompressed mappings is empty. In some examples, to support identifying the first mapping, the queue control component 760 may be configured as or otherwise support a means for determining that a version identifier of an element of a second queue of the plurality of queues satisfies a threshold, where the first mapping includes a mapping included in the second queue.

In some examples, the index of each entry of the plurality of entries is based at least in part on a quantity of logical addresses between the starting logical address of each entry and a reference logical address of a reference entry of the plurality of entries.

In some examples, each physical address of the plurality of physical addresses is associated with a respective page of memory cells of a memory array of the memory system.

In some examples, starting physical addresses of each entry of the plurality of entries are sequential.

In some examples, the mapping identification component 725 may be configured as or otherwise support a means for identifying a third mapping between a plurality of second logical addresses and a plurality of second physical addresses stored in the region. In some examples, the mapping compression component 730 may be configured as or otherwise support a means for refraining from compressing the third mapping based at least in part on determining that a quantity of a set of consecutive sequences of second physical addresses of the plurality of second physical addresses does not satisfy a threshold. In some examples, the mapping storage component 735 may be configured as or otherwise support a means for storing the third mapping to the region.

In some examples, the reception component 740 may be configured as or otherwise support a means for receiving a write command from a host system, the write command including a logical address. In some examples, the data writing component 765 may be configured as or otherwise support a means for writing data associated with the write command to a physical address. In some examples, the mapping storage component 735 may be configured as or otherwise support a means for storing the physical address to an uncompressed mapping at the region.

In some examples, the first mapping includes a plurality of second entries. In some examples, a quantity of bits of each second entry of the plurality of second entries is less than a quantity of bits of each entry of the plurality of entries.

The reception component 740 may be configured as or otherwise support a means for receiving, by a memory system and from a host system, a read command including a logical address. The mapping access component 745 may be configured as or otherwise support a means for accessing one or more candidate entries in a mapping between a plurality of logical addresses and a plurality of physical addresses based at least in part on receiving the read command to identify a physical address associated with the logical address, the mapping including a plurality of entries each configured to store an indication of a sequence of consecutive physical addresses of the plurality of physical addresses, the indication including a starting physical address of the sequence associated with a starting logical address and an index from a reference entry of the mapping, the index based at least in part on the starting logical address. The transmission component 750 may be configured as or otherwise support a means for transmitting data stored at the physical address to the host system.

In some examples, the mapping access component 745 may be configured as or otherwise support a means for determining a region identifier of the mapping based at least in part on the logical address, where accessing one or more candidate logical addresses is based at least in part on the region identifier.

In some examples, the mapping access component 745 may be configured as or otherwise support a means for performing a search of the mapping to identify the one or more candidate entries, the search based at least in part on a respective index of each of the one or more candidate entries. In some examples, the search includes a binary search.

In some examples, the entry control component 755 may be configured as or otherwise support a means for applying an offset to a candidate physical address of a candidate entry of a plurality of candidate entries to obtain the physical address, the offset based at least in part on the logical address and the index of the entry, where transmitting the data is based at least in part on applying the offset.

In some examples, the index of each entry of the plurality of entries is based at least in part on a quantity of logical addresses between the starting logical address of each entry and a reference logical address of a reference entry of the plurality of entries.

In some examples, each physical address of the plurality of physical addresses is associated with a respective page of memory cells of a memory array of the memory system.

In some examples, starting physical addresses of each entry of the plurality of entries are sequential.

FIG. 8 illustrates a flowchart showing a method 800 that supports techniques for logical-to-physical information compression in accordance with examples as disclosed herein. The operations of method 800 may be implemented by a memory system or its components as described herein. For example, the operations of method 800 may be performed by a memory system as described with reference to FIGS. 1 through 7. In some examples, a memory system may execute a set of instructions to control the functional elements of the device to perform the described functions. Additionally, or alternatively, the memory system may perform aspects of the described functions using special-purpose hardware.

At 805, the method may include identifying a first mapping between a plurality of logical addresses and a plurality of physical addresses stored in a region of a cache of a memory system. The operations of 805 may be performed in accordance with examples as disclosed herein. In some examples, aspects of the operations of 805 may be performed by a mapping identification component 725 as described with reference to FIG. 7.

At 810, the method may include generating a second mapping between the plurality of logical addresses and the plurality of physical addresses based at least in part on the first mapping, the second mapping including a plurality of entries each configured to store an indication of a sequence of consecutive physical addresses of the plurality of physical addresses, the indication including a starting physical address of the sequence associated with a starting logical address and an index from a reference entry of the second mapping, the index based at least in part on the starting logical address. The operations of 810 may be performed in accordance with examples as disclosed herein. In some examples, aspects of the operations of 810 may be performed by a mapping compression component 730 as described with reference to FIG. 7.

At 815, the method may include storing the second mapping to the region. The operations of 815 may be performed in accordance with examples as disclosed herein. In some examples, aspects of the operations of 815 may be performed by a mapping storage component 735 as described with reference to FIG. 7.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for identifying a first mapping between a plurality of logical addresses and a plurality of physical addresses stored in a region of a cache of a memory system; generating a second mapping between the plurality of logical addresses and the plurality of physical addresses based at least in part on the first mapping, the second mapping including a plurality of entries each configured to store an indication of a sequence of consecutive physical addresses of the plurality of physical addresses, the indication including a starting physical address of the sequence associated with a starting logical address and an index from a reference entry of the second mapping, the index based at least in part on the starting logical address; and storing the second mapping to the region.

Aspect 2: The method, apparatus, or non-transitory computer-readable medium of aspect 1, where storing the second mapping to the region includes operations, features, circuitry, logic, means, or instructions, or any combination thereof for determining that a quantity of the plurality of entries in the second mapping satisfies a threshold and adding the second mapping to an element of a queue of a plurality of queues based at least in part on the determining, each queue of the plurality of queues corresponding to a different threshold of a plurality of thresholds and each queue of the plurality of queues including one or more elements.

Aspect 3: The method, apparatus, or non-transitory computer-readable medium of aspect 2, further including operations, features, circuitry, logic, means, or instructions, or any combination thereof for allocating a second region of the cache to the queue, where adding the second mapping to the queue includes writing the second mapping to the second region.

Aspect 4: The method, apparatus, or non-transitory computer-readable medium of any of aspects 2 through 3, further including operations, features, circuitry, logic, means, or instructions, or any combination thereof for updating a version identifier of the element based at least in part on adding the second mapping to the element.

Aspect 5: The method, apparatus, or non-transitory computer-readable medium of any of aspects 1 through 4, where identifying the first mapping includes operations, features, circuitry, logic, means, or instructions, or any combination thereof for determining that a queue of a plurality of queues includes one or more uncompressed mappings, where the first mapping includes an uncompressed mapping of the one or more uncompressed mappings.

Aspect 6: The method, apparatus, or non-transitory computer-readable medium of any of aspects 1 through 5, where identifying the first mapping includes operations, features, circuitry, logic, means, or instructions, or any combination thereof for determining that a first queue of a plurality of queues associated with uncompressed mappings is empty and determining that a version identifier of an element of a second queue of the plurality of queues satisfies a threshold, where the first mapping includes a mapping included in the second queue.

Aspect 7: The method, apparatus, or non-transitory computer-readable medium of any of aspects 1 through 6, where the index of each entry of the plurality of entries is based at least in part on a quantity of logical addresses between the starting logical address of each entry and a reference logical address of a reference entry of the plurality of entries.

Aspect 8: The method, apparatus, or non-transitory computer-readable medium of any of aspects 1 through 7, where each physical address of the plurality of physical addresses is associated with a respective page of memory cells of a memory array of the memory system.

Aspect 9: The method, apparatus, or non-transitory computer-readable medium of any of aspects 1 through 8, where starting physical addresses of each entry of the plurality of entries are sequential.

Aspect 10: The method, apparatus, or non-transitory computer-readable medium of any of aspects 1 through 9, further including operations, features, circuitry, logic, means, or instructions, or any combination thereof for identifying a third mapping between a plurality of second logical addresses and a plurality of second physical addresses stored in the region; refraining from compressing the third mapping based at least in part on determining that a quantity of a set of consecutive sequences of second physical addresses of the plurality of second physical addresses does not satisfy a threshold; and storing the third mapping to the region.

Aspect 11: The method, apparatus, or non-transitory computer-readable medium of any of aspects 1 through 10, further including operations, features, circuitry, logic, means, or instructions, or any combination thereof for receiving a write command from a host system, the write command including a logical address; writing data associated with the write command to a physical address; and storing the physical address to an uncompressed mapping at the region.

Aspect 12: The method, apparatus, or non-transitory computer-readable medium of any of aspects 1 through 11, where the first mapping includes a plurality of second entries and a quantity of bits of each second entry of the plurality of second entries is less than a quantity of bits of each entry of the plurality of entries.

FIG. 9 illustrates a flowchart showing a method 900 that supports techniques for logical-to-physical information compression in accordance with examples as disclosed herein. The operations of method 900 may be implemented by a memory system or its components as described herein. For example, the operations of method 900 may be performed by a memory system as described with reference to FIGS. 1 through 7. In some examples, a memory system may execute a set of instructions to control the functional elements of the device to perform the described functions. Additionally, or alternatively, the memory system may perform aspects of the described functions using special-purpose hardware.

At 905, the method may include receiving, by a memory system and from a host system, a read command including a logical address. The operations of 905 may be performed in accordance with examples as disclosed herein. In some examples, aspects of the operations of 905 may be performed by a reception component 740 as described with reference to FIG. 7.

At 910, the method may include accessing one or more candidate entries in a mapping between a plurality of logical addresses and a plurality of physical addresses based at least in part on receiving the read command to identify a physical address associated with the logical address, the mapping including a plurality of entries each configured to store an indication of a sequence of consecutive physical addresses of the plurality of physical addresses, the indication including a starting physical address of the sequence associated with a starting logical address and an index from a reference entry of the mapping, the index based at least in part on the starting logical address. The operations of 910 may be performed in accordance with examples as disclosed herein. In some examples, aspects of the operations of 910 may be performed by a mapping access component 745 as described with reference to FIG. 7.

At 915, the method may include transmitting data stored at the physical address to the host system. The operations of 915 may be performed in accordance with examples as disclosed herein. In some examples, aspects of the operations of 915 may be performed by a transmission component 750 as described with reference to FIG. 7.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 13: A method, apparatus, or non-transitory computer-readable medium including operations, features, circuitry, logic, means, or instructions, or any combination thereof for receiving, by a memory system and from a host system, a read command including a logical address; accessing one or more candidate entries in a mapping between a plurality of logical addresses and a plurality of physical addresses based at least in part on receiving the read command to identify a physical address associated with the logical address, the mapping including a plurality of entries each configured to store an indication of a sequence of consecutive physical addresses of the plurality of physical addresses, the indication including a starting physical address of the sequence associated with a starting logical address and an index from a reference entry of the mapping, the index based at least in part on the starting logical address; and transmitting data stored at the physical address to the host system.

Aspect 14: The method, apparatus, or non-transitory computer-readable medium of aspect 13, further including operations, features, circuitry, logic, means, or instructions, or any combination thereof for determining a region identifier of the mapping based at least in part on the logical address, where accessing one or more candidate logical addresses is based at least in part on the region identifier.

Aspect 15: The method, apparatus, or non-transitory computer-readable medium of any of aspects 13 through 14, further including operations, features, circuitry, logic, means, or instructions, or any combination thereof for performing a search of the mapping to identify the one or more candidate entries, the search based at least in part on a respective index of each of the one or more candidate entries.

Aspect 16: The method, apparatus, or non-transitory computer-readable medium of aspect 15, where the search includes a binary search.

Aspect 17: The method, apparatus, or non-transitory computer-readable medium of any of aspects 15 through 16, further including operations, features, circuitry, logic, means, or instructions, or any combination thereof for applying an offset to a candidate physical address of a candidate entry of a plurality of candidate entries to obtain the physical address, the offset based at least in part on the logical address and the index of the entry, where transmitting the data is based at least in part on applying the offset.

Aspect 18: The method, apparatus, or non-transitory computer-readable medium of any of aspects 13 through 17, where the index of each entry of the plurality of entries is based at least in part on a quantity of logical addresses between the starting logical address of each entry and a reference logical address of a reference entry of the plurality of entries.

Aspect 19: The method, apparatus, or non-transitory computer-readable medium of any of aspects 13 through 18, where each physical address of the plurality of physical addresses is associated with a respective page of memory cells of a memory array of the memory system.

Aspect 20: The method, apparatus, or non-transitory computer-readable medium of any of aspects 13 through 19, where starting physical addresses of each entry of the plurality of entries are sequential.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
one or more controllers associated with a memory device, wherein the one or more controllers are configured to cause the apparatus to:
identify a first mapping between a plurality of logical addresses and a plurality of physical addresses stored in a region of a cache of a memory system;
generate a second mapping between the plurality of logical addresses and the plurality of physical addresses based at least in part on the first mapping, the second mapping comprising a plurality of entries each configured to store an indication of a sequence of consecutive physical addresses of the plurality of physical addresses, the indication comprising a starting physical address of the sequence associated with a starting logical address and an index from a same reference entry of the plurality of entries of the second mapping, the index for each entry based at least in part on the starting logical address for the entry and a reference logical address of the same reference entry of the plurality of entries; and
store the second mapping to the region.

2. The apparatus of claim 1, wherein, to store the second mapping to the region, the one or more controllers are further configured to cause the apparatus to:
determine that a quantity of the plurality of entries in the second mapping satisfies a threshold; and
add the second mapping to an element of a queue of a plurality of queues based at least in part on the determining, each queue of the plurality of queues corresponding to a different threshold of a plurality of thresholds and each queue of the plurality of queues comprising one or more elements.

3. The apparatus of claim 2, wherein the one or more controllers are further configured to cause the apparatus to:
allocate a second region of the cache to the queue, wherein adding the second mapping to the queue comprises writing the second mapping to the second region.

4. The apparatus of claim 2, wherein the one or more controllers are further configured to cause the apparatus to:
update a version identifier of the element based at least in part on adding the second mapping to the element.

5. The apparatus of claim 1, wherein, to identify the first mapping, the one or more controllers are further configured to cause the apparatus to:
determine that a queue of a plurality of queues comprises one or more uncompressed mappings, wherein the first mapping comprises an uncompressed mapping of the one or more uncompressed mappings.

6. The apparatus of claim 1, wherein, to identify the first mapping, the one or more controllers are further configured to cause the apparatus to:
determine that a first queue of a plurality of queues associated with uncompressed mappings is empty; and
determine that a version identifier of an element of a second queue of the plurality of queues satisfies a threshold, wherein the first mapping comprises a mapping included in the second queue.

7. The apparatus of claim 1, wherein the index of each entry of the plurality of entries is based at least in part on a quantity of logical addresses between the starting logical address of each entry and the reference logical address of the same reference entry of the plurality of entries.

8. The apparatus of claim 1, wherein each physical address of the plurality of physical addresses is associated with a respective page of memory cells of a memory array of the memory system.

9. The apparatus of claim 1, wherein starting physical addresses of each entry of the plurality of entries are sequential.

10. The apparatus of claim 1, wherein the one or more controllers are further configured to cause the apparatus to:
identify a third mapping between a plurality of second logical addresses and a plurality of second physical addresses stored in the region;
refrain from compressing the third mapping based at least in part on determining that a quantity of a set of consecutive sequences of second physical addresses of the plurality of second physical addresses does not satisfy a threshold; and
store the third mapping to the region.

11. The apparatus of claim 1, wherein the one or more controllers are further configured to cause the apparatus to:
receive a write command from a host system, the write command comprising a logical address;
write data associated with the write command to a physical address; and store the physical address to an uncompressed mapping at the region.

12. The apparatus of claim 1, wherein:

the first mapping comprises a plurality of second entries; and a quantity of bits of each second entry of the plurality of second entries is less than a quantity of bits of each entry of the plurality of entries.

13. An apparatus, comprising:

one or more controllers associated with a memory device, wherein the one or more controllers are configured to cause the apparatus to:

receive, by a memory system and from a host system, a read command comprising a logical address;

access one or more candidate entries in a mapping between a plurality of logical addresses and a plurality of physical addresses based at least in part on receiving the read command to identify a physical address associated with the logical address, the mapping comprising a plurality of entries each configured to store an indication of a sequence of consecutive physical addresses of the plurality of physical addresses, the indication comprising a starting physical address of the sequence associated with a starting logical address and an index from a same reference entry of the plurality of entries of the mapping, the index for each entry based at least in part on the starting logical address for the entry and a reference logical address of the same reference entry of the plurality of entries; and transmit data stored at the physical address to the host system.

14. The apparatus of claim 13, wherein the one or more controllers are further configured to cause the apparatus to:

determine a region identifier of the mapping based at least in part on the logical address, wherein accessing one or more candidate logical addresses is based at least in part on the region identifier.

15. The apparatus of claim 13, wherein the one or more controllers are further configured to cause the apparatus to:

perform a search of the mapping to identify the one or more candidate entries, the search based at least in part on a respective index of each of the one or more candidate entries.

16. The apparatus of claim 15, wherein the search comprises a binary search.

17. The apparatus of claim 15, wherein the one or more controllers are further configured to cause the apparatus to:

apply an offset to a candidate physical address of a candidate entry of a plurality of candidate entries to obtain the physical address, the offset based at least in part on the logical address and the index of the candidate entry, wherein transmitting the data is based at least in part on applying the offset.

18. The apparatus of claim 13, wherein the index of each entry of the plurality of entries is based at least in part on a quantity of logical addresses between the starting logical address of each entry and the reference logical address of the same reference entry of the plurality of entries.

19. The apparatus of claim 13, wherein each physical address of the plurality of physical addresses is associated with a respective page of memory cells of a memory array of the memory system.

20. A non-transitory computer-readable medium storing code comprising instructions which, when executed by a processor of an electronic device, cause the electronic device to:

identify a first mapping between a plurality of logical addresses and a plurality of physical addresses stored in a region of a cache of a memory system;

generate a second mapping between the plurality of logical addresses and the plurality of physical addresses based at least in part on the first mapping, the second mapping comprising a plurality of entries each configured to store an indication of a sequence of consecutive physical addresses of the plurality of physical addresses, the indication comprising a starting physical address of the sequence associated with a starting logical address and an index from a same reference entry of the plurality of entries of the second mapping, the index for each entry based at least in part on the starting logical address for the entry and a reference logical address of the same reference entry of the plurality of entries; and store the second mapping to the region.

\* \* \* \* \*